(12) United States Patent
Wang et al.

(10) Patent No.: US 8,672,501 B2
(45) Date of Patent: Mar. 18, 2014

(54) MIRROR DEVICE WITH ILLUMINATION AND MIRROR BOX USING THE SAME

(75) Inventors: Ching-Chiun Wang, Miaoli County (TW); Chien-Chih Chen, Taichung County (TW); Chih-Yung Huang, Taichung County (TW); Szu-Hao Chen, Changhua County (TW); Yi-Shan Wang, Tainan (TW)

(73) Assignee: Industrial Technology Research Institute, Hsin-Chu (TW)

( * ) Notice: Subject to any disclaimer, the term of this patent is extended or adjusted under 35 U.S.C. 154(b) by 180 days.

(21) Appl. No.: 13/458,733

(22) Filed: Apr. 27, 2012

(65) Prior Publication Data

US 2013/0188339 A1 Jul. 25, 2013

(30) Foreign Application Priority Data

Jan. 19, 2012 (TW) .............................. 101201408 U

(51) Int. Cl.
*F21V 33/00* (2006.01)
*H01L 33/00* (2010.01)

(52) U.S. Cl.
USPC .............................. 362/135; 362/136; 257/98

(58) Field of Classification Search
USPC ..................................... 362/135, 136; 257/98
See application file for complete search history.

(56) References Cited

U.S. PATENT DOCUMENTS

| 8,042,985 B2* | 10/2011 | Choi .............................. 362/617 |
| 2005/0174756 A1 | 8/2005 | Verburg |
| 2010/0296298 A1 | 11/2010 | Martin, Jr. |

FOREIGN PATENT DOCUMENTS

| CN | 1846294 A | 10/2006 |
| CN | 201727203 U | 2/2011 |
| TW | M267906 U | 6/2005 |
| TW | M279238 U | 11/2005 |
| TW | M342788 U | 10/2008 |
| TW | M362928 U | 8/2009 |
| TW | 200942872 | 10/2009 |

(Continued)

OTHER PUBLICATIONS

Köhnen et al., "High color-Stable solution-processed multilayer WOLEDs for lighting application", Journal of Materials Chemistry, vol. 20, pp. 3301-3306, 2010.
Li et al., "Discharge and photo-luminance properties of a parallel plates electron emission lighting device", Optics Express, vol. 19, No. S1, pp. A51-A56, Jan. 3, 2011.

(Continued)

*Primary Examiner* — Stephen F Husar
*Assistant Examiner* — James Cranson, Jr.
(74) *Attorney, Agent, or Firm* — Birch, Stewart, Kolasch & Birch, LLP

(57) ABSTRACT

The present disclosure provides a mirror device with illumination comprising a transparent conductive substrate, an isolation layer, a mirror layer and a light emitting diode (LED) layer. The isolation layer, formed on a surface of the transparent conductive substrate, divides the surface of the transparent conductive substrate into at least one first region and at least one second region. The mirror layer formed on the transparent conductive substrate within the at least one first region, while the LED layer is formed on the transparent conductive substrate within the at least one second region, wherein the mirror layer and the LED layer are electrically isolated from each other. In another embodiment, the present disclosure further provides a mirror box having the mirror device with illumination disposed therein so that the mirror device can be easily carried and kept in the pocket, or purse of user.

16 Claims, 6 Drawing Sheets

(56) References Cited

FOREIGN PATENT DOCUMENTS

| | | | |
|---|---|---|---|
| TW | M374027 | U1 | 2/2010 |
| TW | M381312 | U1 | 6/2010 |
| TW | M385648 | U1 | 8/2010 |
| TW | M398355 | U1 | 2/2011 |
| TW | M403932 | U1 | 5/2011 |
| TW | M410179 | U1 | 8/2011 |

OTHER PUBLICATIONS

Yang et al., "High-efficiency and high-quality white organic light-emitting diode employing flourescent emitters", Organic Electronics, vol. 12, pp. 29-33, 2011.

\* cited by examiner

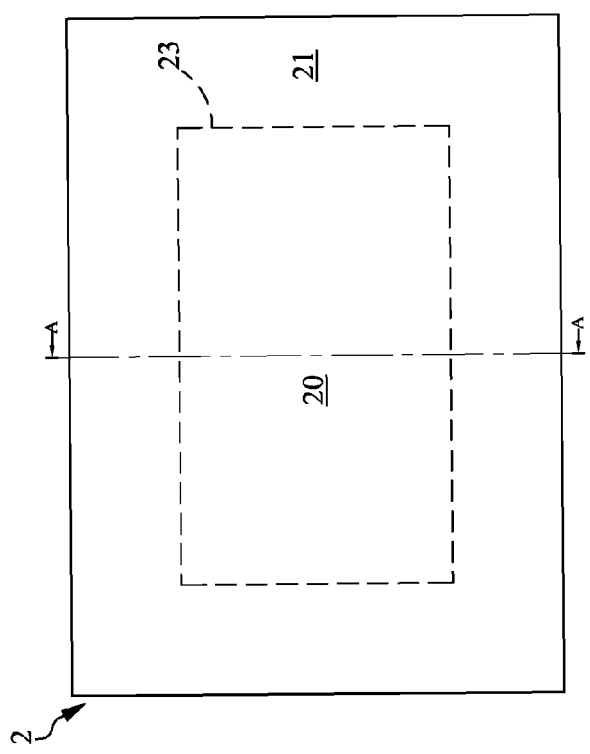
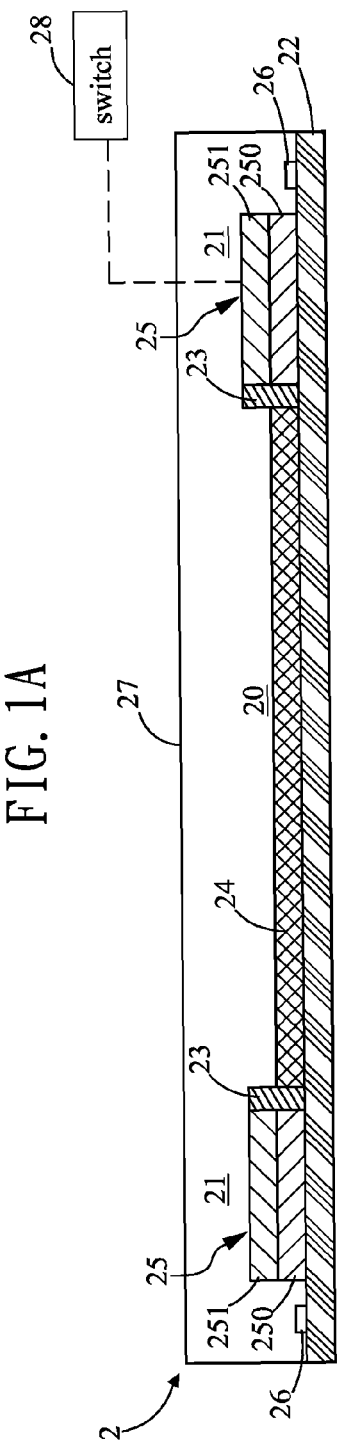

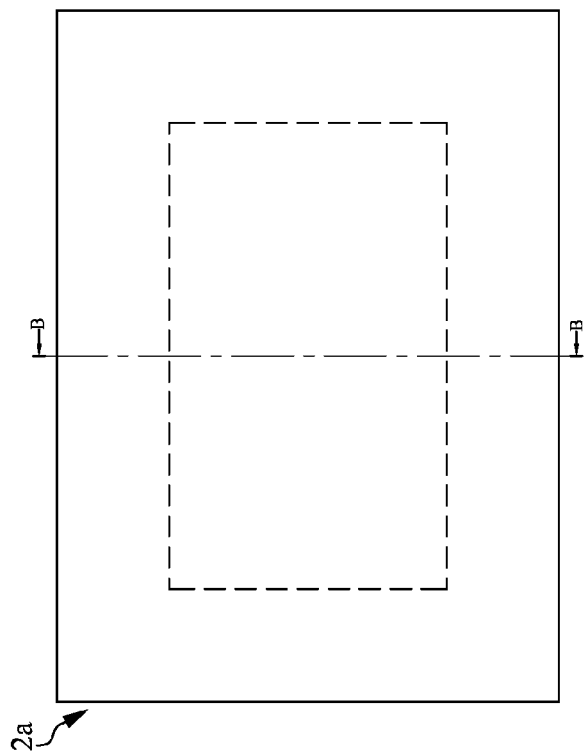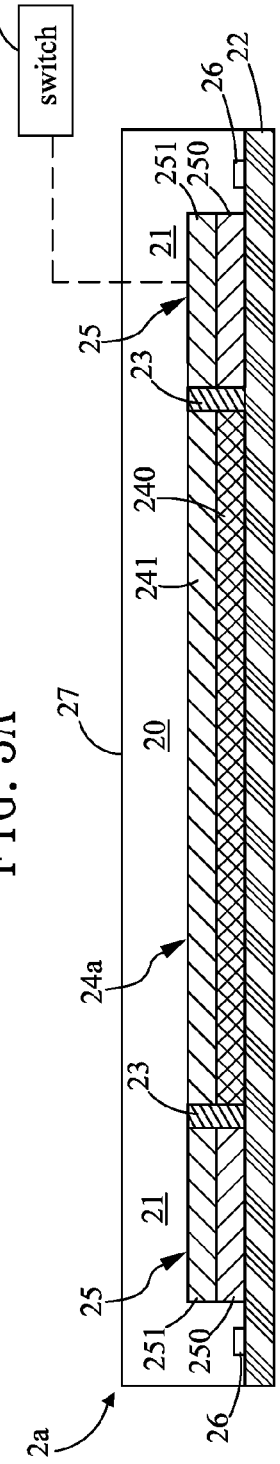
FIG. 3A
FIG. 3B

MIRROR DEVICE WITH ILLUMINATION AND MIRROR BOX USING THE SAME

TECHNICAL FIELD

The present disclosure relates to a mirror device, and more particularly, to a mirror device with illumination.

TECHNICAL BACKGROUND

In our daily lives, mirrors can be essential and are commonly used for personal grooming or admiring oneself, decoration, and architecture. Almost every household is fitted with mirrors of different sizes and shapes. Generally, mirrors designed to be used in dressing rooms or bath rooms in a household are comparatively larger, while those for personal usage are usually built in smaller size, or in some case, in a size small enough so as to be portable.

A mirror is a very flat surface that reflects almost all the light without distorting. Operationally, when an object is placed in front of a mirror, a portion of light rays reflected off the object will be projected toward the mirror where they are reflected, and thus an image of the object will be formed as soon as the reflected rays are received by a human eye or an optical sensing device. Therefore, since a mirror image is substantially a reflected duplication of an object placed in front of a mirror, the quality of the mirror image is greatly dependent upon how well the object is being illuminated.

Consequently, in the nighttime or in a dark room where an object is poorly illuminated, it is difficult to mirror a clear virtue image of the object. There are already many studies for overcoming the aforesaid shortcoming. One of which is a mirror disclosed in TW Pat. Pub. No. 200942872, and another is an illuminated cosmetic mirror disclosed in TW Pat. No. M381312.

TECHNICAL SUMMARY

The present disclosure relates to provide a mirror device with an illumination device for grooming and illumination as well. Operationally, in a well-lighted situation, the mirror device is simply a mirror without having its illumination device to be activated, but while being situated in a dark environment, the illumination device can be activated so as to project a uniform light for the illumination of a larger work area.

The present disclosure relates to a mirror box for receiving a mirror with an illumination device embedded therein, by that in a well-lighted situation, the mirror is simply a mirror without having its illumination device to be activated, but while being situated in a dark environment, the illumination device can be activated so as to project a uniform light for the illumination of a larger work area. The mirror box is adapted for personal grooming or make-up, and is designed to be portable.

In an embodiment, the present disclosure provides a mirror device with illumination comprising: a transparent conductive substrate, an isolation layer, a mirror layer and a light emitting diode (LED) layer. The isolation layer is formed on a surface of the transparent conductive substrate for dividing the surface of the transparent conductive substrate into at least one first region and at least one second region. The mirror layer is formed on the transparent conductive substrate within the at least one first region, while the LED layer is formed on the transparent conductive substrate within the at least one second region. Moreover, the mirror layer and the LED layer are electrically isolated from each other.

In another embodiment, the present disclosure further provides a mirror box, comprising: a box; a cover, coupled to the box for covering the box; a mirror device with illumination, disposed on the cover at a position corresponding to the box, further comprising: a transparent conductive substrate; an isolation layer, formed on a surface of the transparent conductive substrate for dividing the surface of the transparent conductive substrate into at least one first region and at least one second region; a mirror layer, formed on the transparent conductive substrate within the at least one first region; and a light emitting diode (LED) layer, formed on the transparent conductive substrate within the at least one second region; wherein, the mirror layer and the LED layer are electrically isolated from each other.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 1A and FIG. 1B are a top view and an A-A cross sectional view of a mirror device with illumination according to a first embodiment of the present disclosure.

FIG. 3A and FIG. 3B are a top view and a B-B cross sectional view of a mirror device with illumination according to a second embodiment of the present disclosure.

DESCRIPTION OF THE EXEMPLARY EMBODIMENTS

Figure 2:
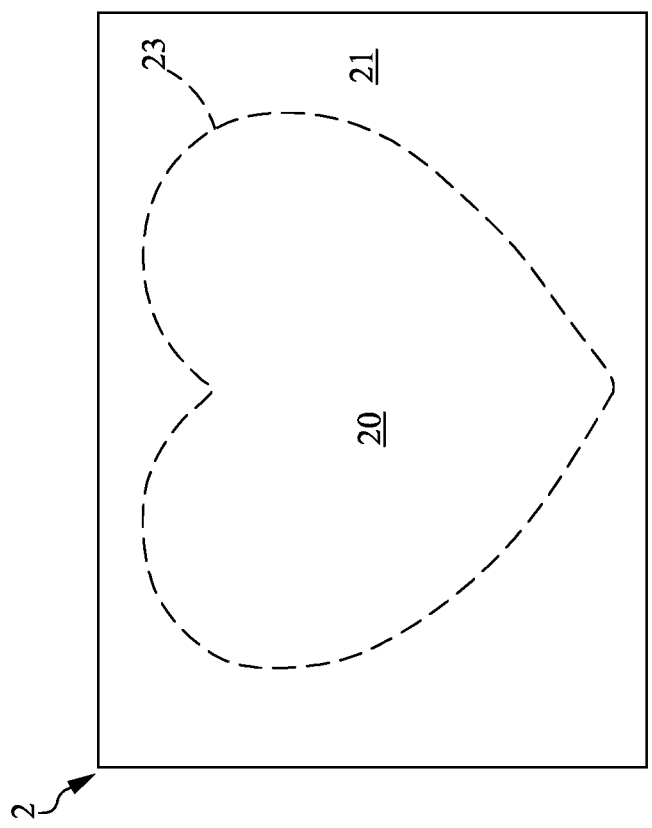
FIG. 2 is a schematic diagram showing a heart-shaped isolation layer used in the mirror device of the present disclosure.

For your esteemed members of reviewing committee to further understand and recognize the fulfilled functions and structural characteristics of the disclosure, several exemplary embodiments cooperating with detailed description are presented as the follows.

Please refer to FIG. 1A and FIG. 1B, which are a top view and an A-A cross sectional view of a mirror device with illumination according to a first embodiment of the present disclosure. In this first embodiment, a mirror device with illumination 2 is provided, which comprises: a transparent conductive substrate 22, an isolation layer 23, a mirror layer 24 and a light emitting diode (LED) layer 25. It is noted that the transparent conductive substrate 22 can be made of a transparent conductive glass or a flexible transparent conductive material. Generally, the transparent conductive substrate 22 is a transparent conducting film formed on a transparent glass or a flexible transparent panel. In addition, the flexible transparent conductive material that can be used for making the transparent conductive substrate 22 can be a polymer, such as polyethylene terephthalate (PET), or poly carbonate (PC), but is not limited thereby, and the transparent conducting film that is to be formed on a transparent glass for forming the transparent conductive substrate 22 can be indium tin oxide (ITO), Al-doped ZnO (AZO) or fluorine-doped tin oxide (FTO), but is also not limited thereby.

The isolation layer 23 is formed on a surface of the transparent conductive substrate 22 for dividing the surface of the transparent conductive substrate 22 into at least one first region 20 and at least one second region 21. It is noted that the isolation layer 23 can be made of silicon dioxide or a metal oxide, such as cesium trioxide, and molybdenum trioxide. In this embodiment, the cross section of the isolation layer 23 is shaped like a rectangle. Moreover, the mirror layer 24 should be made of a light reflective material, such as a kind of metal, and in this embodiment, the mirror layer 24 is made of silver. As for the light emitting diode layer 25, it is formed on the transparent conductive substrate 22 within the at least one second region 21, and the light emitting diode layer 25, being substantially an organic light emitting diode layer, is comprised of: an organic light emitting layer 250, formed on the transparent conductive layer 22; and a conductive metal layer 251, formed on the organic light emitting layer 250. Operationally, the transparent conductive layer 22 and the conductive metal layer 251 are defined and used respectively as an anode and a cathode of a current circuit for activating the organic light emitting layer 250 to emit light. Moreover, by the insulation of the isolation layer 23, the mirror layer 24, that is formed within the first region 20, and the LED layer 25, that is formed within the second region 21, are electrically isolated from each other.

In addition, the mirror device with illumination 2 that is provided in the first embodiment further comprises: an adhesive layer 26 and a cover plate 27, in which the adhesive layer 26 is formed on the transparent conductive substrate 22 at a position surrounding the perimeter of the at least one first region 20 and the at least one second region 22; and the cover plate 27 is disposed on the transparent conductive substrate 22 while being adhered to the adhesive layer 26. By the arrangement of the adhesive layer 26, the cover plate 27 can be adhered and engaged tightly to the transparent conductive substrate 22 with good airtightness and waterproof effects, and thus the electrical structures formed inside the transparent conductive substrate 22 are protected. It is noted that the cover plate 27 can be made of a glass or a polymer plastic, but in this embodiment, the cover plate 27 is made of a glass. Moreover, the LED layer 25 of the mirror device 2 can be arranged to coupled to a electric switch 28 or an assembly of a sensor and a controller, by that the switch or the assembly can be used for controlling the activation of the LED layer 25. In a condition when the LED layer 25 is coupled to a switch 28, it is possible for a user to manually turn on the switch 28 for activating the LED layer 25. On the other hand, when the LED layer 25 is coupled to an assembly of a sensor and a controller, the sensor that is designed to detect the lighting condition of its ambient environment is enabled to issue a sensing signal to the controller for allowing the controller to determining whether or not to activate the LED layer 25 according to the sensing signal.

Operationally, in a well-lighted environment, by the mirror layer 24 formed within the first region 20 and the metal conductive layer 251 formed within the second region 21, the mirror device 2 of the first embodiment is very capable of working as a simple mirror. But, when the mirror device 2 is situated in a dark environment, a user can simply turn on the switch 28 for activating the LED layer 25 formed within the second region 21 to illuminate so as to light up the ambient environment for allowing the mirror device 2 to work properly as a mirror. Moreover, by the arrangement of the isolation layer 23 at a position between the first region 20 and the second region 21, the LED layer 25 can be prevented from being shirt circuited by the mirror layer 24. In addition, although there are only one first region 20 and one second region 21 in the embodiment shown in FIG. 1A and FIG. 1B, the amounts of the first region 20 and the second region can be determined according to actual requirement and thus are not limited by the first embodiment, which is also true with respect to their shapes and locations.

It is noted that the isolation layer 23 can be formed into any shape at will according to actual requirement, and thereby, when the LED layer 25 is being activated to illuminate, a mirror with a certain outlook can be constructed according to the shape of the isolation layer 23. Please refer to FIG. 2, which is a schematic diagram showing a heart-shaped isolation layer used in the mirror device of the present disclosure. In FIG. 2, the isolation layer 23 is formed as a heart, so that a heart-like mirror can be constructed when the LED layer 25 is being activated to illuminate. It is noted that the isolation layer 23 can be formed into different shapes at will for different users.

Please refer to FIG. 3A and FIG. 3B, which are a top view and a B-B cross sectional view of a mirror device with illumination according to a second embodiment of the present disclosure. In this second embodiment, a mirror device with illumination 2a is provided, which also comprises: a transparent conductive substrate 22, an isolation layer 23, a mirror layer 24a, a light emitting diode (LED) layer 25, an adhesive layer 26 and a cover plate 27. Basically, the transparent conductive substrate 22, the isolation layer 23, the light emitting diode (LED) layer 25, the adhesive layer 26 and the cover plate 27 are constructed the same as those disclosed in FIG. 1A and FIG. 1B, but the difference between the first embodiment and the second embodiment is that: the mirror layer 24a in the second embodiment is a light emitting diode layer. Moreover, the mirror layer 24a, being a light emitting diode layer, is substantially an organic light emitting diode layer that is composed of an organic light emitting layer 240 and a metal conductive layer 241. Similarly, by the insulation of the isolation layer 23, the mirror layer 24a, that is formed within the first region 20, and the LED layer 25, that is formed within the second region 21, are electrically isolated from each other.

Operationally, in a well-lighted environment, by the mirror layer 24a formed within the first region 20 and the metal conductive layer 251 formed within the second region 21, the mirror device 2a of the second embodiment is very capable of working as a simple mirror. But, when the mirror device 2a of the second embodiment is situated in a dark environment, a user can simply turn on a switch 28 or use the sensing of an assembly including a sensor and a controller for activating the LED layer 25 formed within the second region 21 and the mirror layer 24a, which is also an additional LED layer, to illuminate simultaneously so as to light up the ambient environment for allowing the mirror device 2a to work properly as a mirror. Moreover, by the arrangement of the isolation layer 23 at a position between the first region 20 and the second region 21, the LED layer 25 can be prevented from being shirt circuited by the mirror layer 24a.

Figure 4:
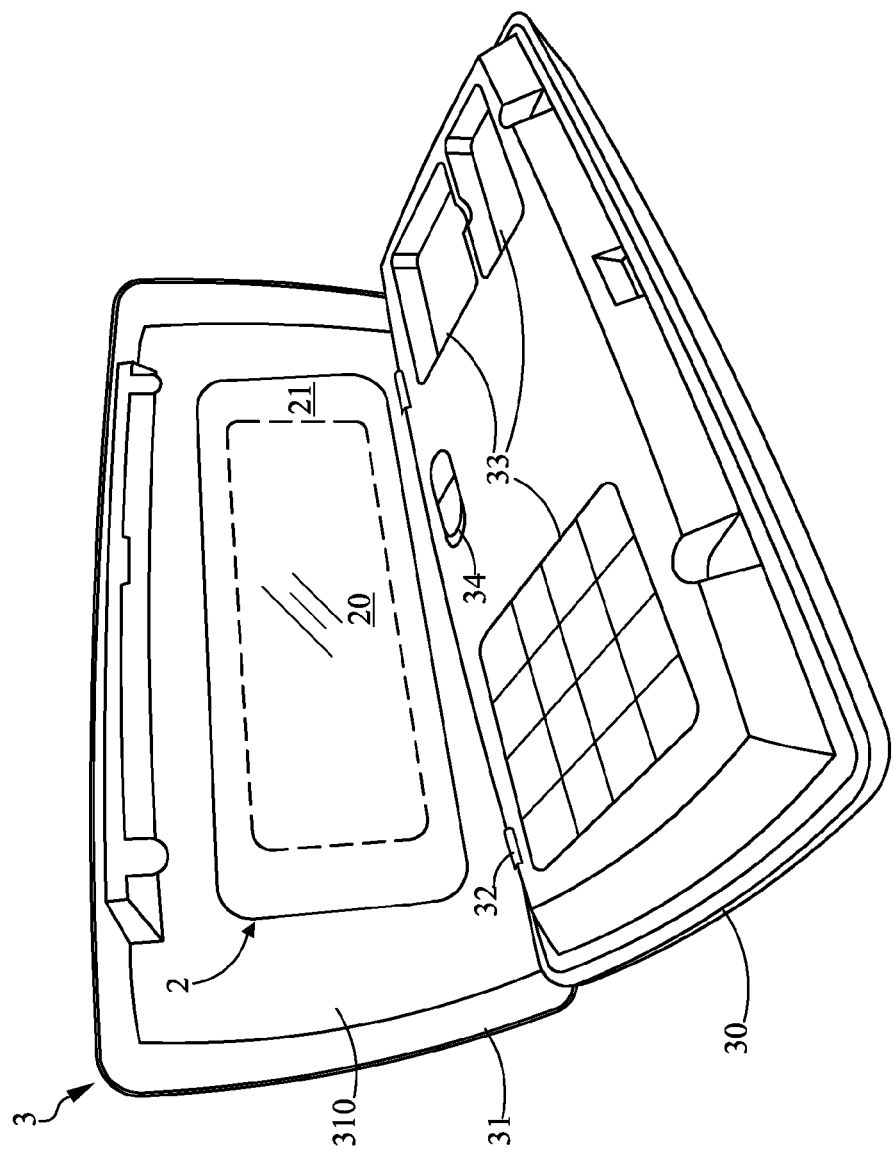
FIG. 4 is a three-dimensional view of a mirror box according to the present disclosure.

Please refer to FIG. 4, which is a three-dimensional view of a mirror box according to the present disclosure. In the embodiment shown in FIG. 4, the mirror box 3 is substantially a make-up case, which comprises: a box 30, a cover 31 and a mirror device with illumination 2. The cover 31 is arranged coupling to the box 31 for allowing the cover to pivot about the joint 32, and thus enabling the box 30 to be open or close accordingly. There are a plurality of accommodation spaces 33 defined within the box 30 that are to be used for receiving different cosmetics. In addition, the mirror device with illumination 2 is disposed on the cover 31 at a surface thereof corresponding to the box 30, and mirror device with illumination 2 can be constructed exactly as those disclosed in the embodiments shown in FIG. 1A to FIG. 3B, and thus will not be described further herein. Operationally, in a well-lighted environment, the mirror device 2 of FIG. 4 is very capable of working as a simple mirror. But, when the mirror device 2 of FIG. 4 is situated in a dark environment, a user can simply turn on a switch 34 or an assembly including a sensor and a controller for activating the LED layer 25 formed within the second region 21 to illuminate so as to light up the ambient environment for allowing the first region 20 of the mirror device 2 to work properly as a mirror.

Figure 5:
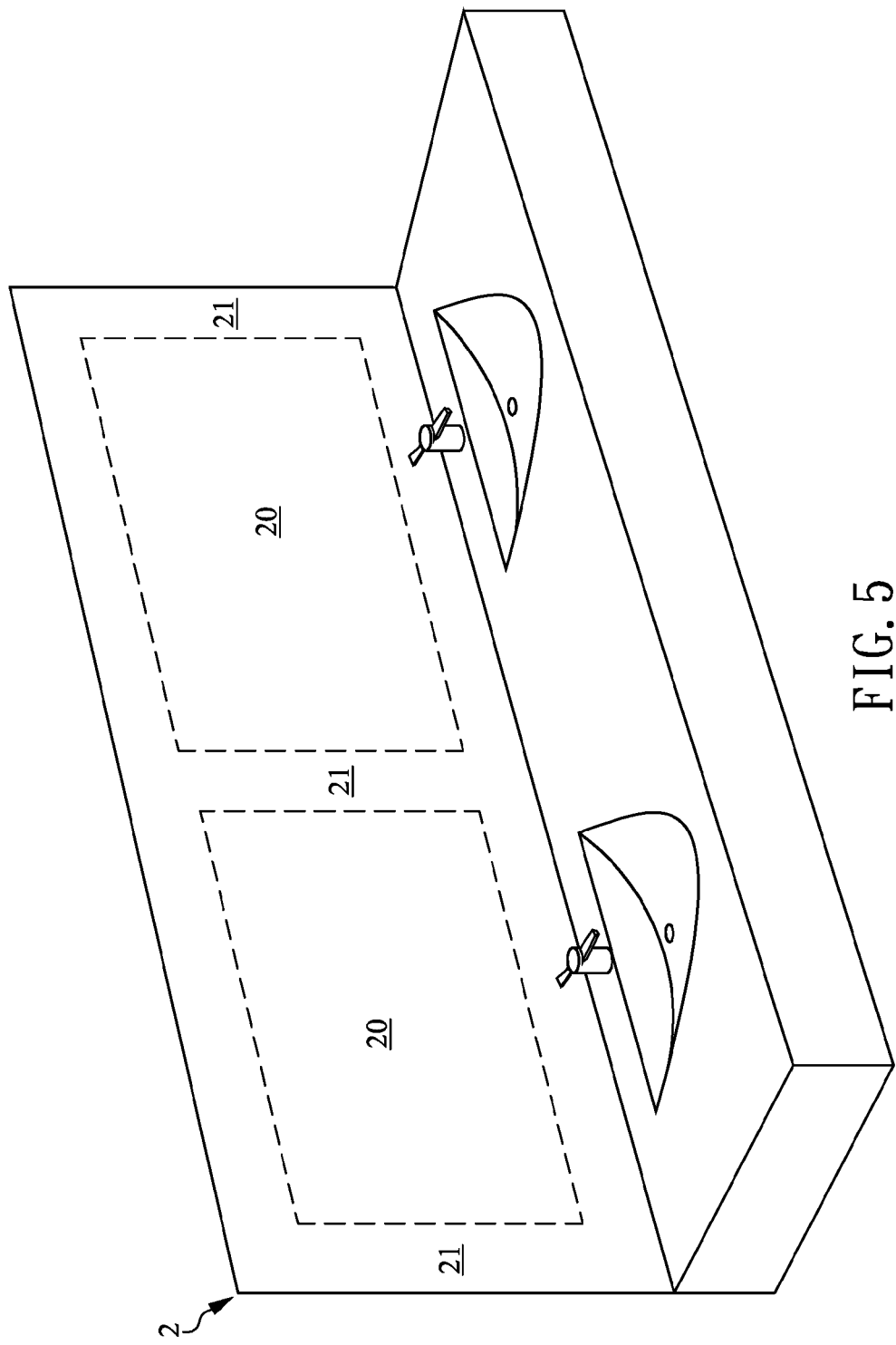
FIG. 5 and FIG. 6 are schematic diagrams showing the use of a mirror device with illumination of the present disclosure in different applications.
Figure 6:
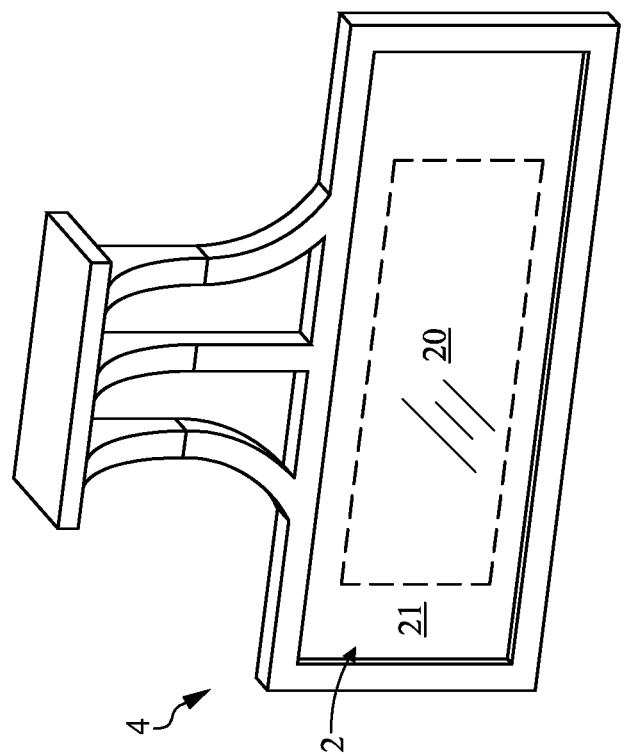

In addition to the abovementioned mirror devices 2 and 2a that are adapted for a mirror box, as the one shown in FIG. 4, they can also be adapted for mirrors in bathrooms, as shown in FIG. 5, or the rear-view mirrors for vehicles, as shown in FIG. 6. Taking a mirror arranged above a washing basin in a bathroom for example, as shown in FIG. 5, the mirror can be constructed exactly the same as the mirror device 2 shown in FIG. 2B, or the mirror device 2a shown in FIG. 3B, by that the mirror device 2 or 2a can work properly as a normal mirror under normal condition, but when the lighting in the bathroom is malfunctioned or the user using the mirror in the bathroom feels that it is not bright enough, the LEDs in the second region 21 can be activated to illuminate by either turning on the switch or by the sensing of an assembly including a sensor and a controller. Similarly, the mirror device 2 of FIG. 1B or the mirror device 2a shown in FIG. 3B can be adapted to be used as the rear-view mirrors in vehicles, by that the mirror device 2 or 2a can work properly as a normal mirror for reflecting the driving condition rear to the vehicle when the environment ambient to the vehicle is well illuminated, but when the vehicle is driving in a dark environment, the LEDs in the second region 21 can be activated to illuminate by either turning on the switch or by the sensing of an assembly including a sensor and a controller.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A mirror device with illumination, comprising:
a transparent conductive substrate;
an isolation layer, formed on a surface of the transparent conductive substrate for dividing the surface of the transparent conductive substrate into at least one first region and at least one second region;
a mirror layer, formed on the transparent conductive substrate within the at least one first region; and
a light emitting diode (LED) layer, formed on the transparent conductive substrate within the at least one second region;
wherein, the mirror layer and the LED layer are electrically isolated from each other.

2. The mirror device with illumination of claim 1, wherein the mirror layer is made of a reflective metallic material.

3. The mirror device with illumination of claim 1, wherein the mirror layer is substantially a second light emitting diode layer, capable of reflecting light when it is not powered.

4. The mirror device with illumination of claim 1, wherein the first light emitting diode layer further comprises:
an organic light emitting layer, formed on the transparent conductive substrate; and
a conductive metal layer, formed on the organic light emitting diode layer.

5. The mirror device with illumination of claim 1, wherein the isolation layer is made of silicon dioxide or a metal oxide selected from the group consisting of: cesium trioxide, and molybdenum trioxide.

6. The mirror device with illumination of claim 1, wherein the transparent conductive substrate is substantially a conductive glass substrate.

7. The mirror device with illumination of claim 1, wherein the transparent conductive substrate is substantially a flexible conductive polymer substrate.

8. The mirror device with illumination of claim 1, further comprising:
an adhesive layer, formed on the transparent conductive substrate at a position surrounding the perimeter of the at least one first region and the at least one second region; and
a cover plate, disposed on the transparent conductive substrate while being adhered to the adhesive layer.

9. A mirror box, comprising:
a box;
a cover, coupled to the box for covering the box; and
a mirror device with illumination, disposed on the cover at a surface thereof corresponding to the box, further comprising:
a transparent conductive substrate;
an isolation layer, formed on a surface of the transparent conductive substrate for dividing the surface of the transparent conductive substrate into at least one first region and at least one second region;
a mirror layer, formed on the transparent conductive substrate within the at least one first region; and
a light emitting diode (LED) layer, formed on the transparent conductive substrate within the at least one second region;
wherein, the mirror layer and the LED layer are electrically isolated from each other.

10. The mirror box of claim 9, wherein the mirror layer is made of a reflective metallic material.

11. The mirror box of claim 9, wherein the mirror layer is substantially a second light emitting diode layer, capable of reflecting light when it is not powered.

12. The mirror box of claim 9, wherein the first light emitting diode layer further comprises:
an organic light emitting layer, formed on the transparent conductive substrate; and
a conductive metal layer, formed on the organic light emitting diode layer.

13. The mirror box of claim 9, wherein the isolation layer is made of silicon dioxide or a metal oxide.

14. The mirror box of claim 9, wherein the transparent conductive substrate is substantially a conductive glass substrate.

15. The mirror box of claim 9, wherein the transparent conductive substrate is substantially a flexible conductive polymer substrate.

16. The mirror box of claim 9, further comprising:
an adhesive layer, formed on the transparent conductive substrate at a position surrounding the perimeter of the at least one first region and the at least one second region; and
a cover plate, disposed on the transparent conductive substrate while being adhered to the adhesive layer.

\* \* \* \* \*